United States Patent
Mammen et al.

(10) Patent No.: US 10,856,469 B2
(45) Date of Patent: Dec. 8, 2020

(54) HIGH STRENGTH SIEVE

(71) Applicant: HCC, INC., Mendota, IL (US)

(72) Inventors: David Mammen, Mendota, IL (US); Paul Aubry, Ottawa, IL (US)

(73) Assignee: HCC, INC., Mendota, IL (US)

( * ) Notice: Subject to any disclaimer, the term of this patent is extended or adjusted under 35 U.S.C. 154(b) by 179 days.

(21) Appl. No.: 15/980,483

(22) Filed: May 15, 2018

(65) Prior Publication Data
US 2019/0059234 A1 Feb. 28, 2019

Related U.S. Application Data

(60) Provisional application No. 62/548,779, filed on Aug. 22, 2017.

(51) Int. Cl.
*A01F 12/44* (2006.01)

(52) U.S. Cl.
CPC .......... *A01F 12/448* (2013.01); *A01F 12/446* (2013.01)

(58) Field of Classification Search
CPC ...... A01F 12/448; A01F 12/446; A01F 12/34; A01F 12/32; A01F 12/44; B07B 1/12; B07B 1/4618; B07B 9/00; A01D 41/1276
See application file for complete search history.

(56) References Cited

U.S. PATENT DOCUMENTS

| | | | | |
|---|---|---|---|---|
| 1,448,725 A * | 3/1923 | Campbell | ............. | B21D 53/00 209/393 |
| 2,253,296 A * | 8/1941 | Holtzman | ............. | A01F 12/446 209/394 |
| 2,362,099 A * | 11/1944 | Sargent | ............. | B07B 1/12 209/394 |
| 2,413,382 A * | 12/1946 | Sargent | ............. | A01F 12/446 209/394 |
| 3,334,744 A * | 8/1967 | James | ............. | A01F 12/446 209/394 |
| 3,472,377 A * | 10/1969 | Payne | ............. | A01F 12/446 209/394 |
| 4,259,829 A * | 4/1981 | Strubbe | ............. | A01D 41/1276 460/1 |
| 4,511,466 A * | 4/1985 | Jones | ............. | A01F 12/446 209/394 |

(Continued)

FOREIGN PATENT DOCUMENTS

EP   1068792 A1 * 1/2001   ........... A01F 12/448

*Primary Examiner* — Arpad Fabian-Kovacs
(74) *Attorney, Agent, or Firm* — Clark Hill PLC; James R. Foley

(57) ABSTRACT

A high strength sieve which is lightweight and durable without having to add springs, and without requiring a high level of force to effect adjustment of the louvers. The high strength sieve utilizes hollow tubes to support the louvers. Providing hollow tubes (i.e., rather than solid wires) allows for larger diameter holes to be used in the frame. This provides for increased bearing surfaces, as well as provides for better tolerances. This reduces the movement of the tubes within the holes. Preferably, the tubes are mounted in the frame through holes which are extruded, thereby providing for increased bearing surfaces and a tighter fit. The extruded holes also provide a natural lead-in for the insertion of the tubes (i.e., during assembly of the sieve). Alternatively, solid wires can be provided extending through the extruded holes instead of hollow tubes.

3 Claims, 4 Drawing Sheets

(56) References Cited

U.S. PATENT DOCUMENTS

| | | | | |
|---|---|---|---|---|
| 4,770,190 A * | 9/1988 | Barnett | A01F 12/446 | 209/394 |
| 5,462,174 A * | 10/1995 | Truckenbrod | B07B 1/46 | 209/394 |
| 5,489,029 A * | 2/1996 | Jonckheere | A01F 12/448 | 209/352 |
| 6,053,812 A * | 4/2000 | Loewen | A01F 12/446 | 460/101 |
| 6,890,253 B2 * | 5/2005 | Mammen | A01F 12/448 | 460/101 |
| 6,953,397 B2 * | 10/2005 | Jonckheere | A01F 12/448 | 460/101 |
| 7,029,392 B2 * | 4/2006 | Jonckheere | A01F 12/448 | 460/101 |
| 7,448,498 B2 * | 11/2008 | McRobert | B07B 1/48 | 209/394 |
| 7,566,266 B1 * | 7/2009 | Ricketts | A01F 11/06 | 460/101 |
| 7,909,171 B2 * | 3/2011 | Mammen | A01F 12/34 | 209/393 |
| 7,997,967 B2 * | 8/2011 | Ricketts | A01F 12/448 | 209/394 |
| 9,901,033 B1 * | 2/2018 | Schoeny | A01F 12/446 | |
| 2002/0128054 A1 * | 9/2002 | Lauer | A01D 41/1276 | 460/101 |
| 2002/0183103 A1 * | 12/2002 | Anderson | A01F 12/448 | 460/101 |
| 2003/0130019 A1 * | 7/2003 | Mammen | A01F 12/448 | 460/101 |
| 2007/0000816 A1 * | 1/2007 | McRobert | B07B 1/12 | 209/394 |
| 2008/0029443 A1 * | 2/2008 | Mammen | A01F 12/34 | 209/395 |
| 2010/0113113 A1 * | 5/2010 | Ricketts | A01F 12/448 | 460/101 |
| 2013/0210505 A1 * | 8/2013 | Bischoff | A01F 12/448 | 460/101 |
| 2015/0087364 A1 * | 3/2015 | Adamson | A01F 12/34 | 460/79 |
| 2015/0087366 A1 * | 3/2015 | Pearson | A01F 12/34 | 460/95 |
| 2016/0286728 A1 * | 10/2016 | De Smet | A01F 12/448 | |
| 2016/0345501 A1 * | 12/2016 | Baert | A61B 6/467 | |
| 2018/0288940 A1 * | 10/2018 | Meschke | A01D 41/06 | |
| 2019/0082597 A1 * | 3/2019 | Maney | A01D 41/1276 | |
| 2020/0100432 A1 * | 4/2020 | Andrios | A01F 12/448 | |

* cited by examiner

HIGH STRENGTH SIEVE

RELATED APPLICATION (PRIORITY CLAIM)

This application claims the benefit of U.S. Provisional Application Ser. No. 62/548,779, filed Aug. 22, 2017, which is hereby incorporated herein by reference in its entirety.

BACKGROUND

The present invention generally relates to sieves used in combine harvesters, and more specifically relates to an improved high strength sieve.

Typically, grain and seed crops are harvested by having a combine harvester detach the grain from unwanted portions of the source plants and other matter, such as rocks and weeds. Specifically, a mixture of detached grain and other vegetation parts ("chaff") is carried by a conveyer into the interior of the housing of the combine harvester for processing, to further separate the grain from the chaff. In the course of processing within the combine, the mixed grain and chaff are passed over sieves which are agitated (i.e., shaken) and configured to permit the grain to fall, via gravity, through the sieve for separation from the larger chaff.

FIG. 1 illustrates a standard or conventional sieve construction. As shown, the sieve 10 comprises a generally rectangular frame 12 and a plurality of overlapping banks of slats 14. As shown in FIG. 2, the slats 14 define openings 15 through which the grain falls (i.e., by gravity). Typically, each bank of slats 14 includes two or more slats separated by one or more dividers 16, and each bank is mounted end-to-end on a solid metal wire 18 which is rotatably mounted between the side channels 20 of the frame 12. A typical sieve is provided as being a single rectangular frame having eight or more overlapping banks of slats. In some cases, a single slat is used with no divider. However, in most cases, as shown in FIG. 1, the frame also includes one or more elongated dividers 16 extending parallel to the side channels 20 connected to ends 21 of the frame 12 and both the side channels 20 and dividers 16 include a plurality of longitudinally spaced apertures 22, which rotatably support the solid metal wires 18.

Typically, a sieve 10 is assembled by sliding the wires 18 through the respective apertures 22 in each divider 16, so that the dividers 16 are "strung" on the wires 18 before the ends of the wires 18 are inserted into straight cut, round apertures provided in the side channels 20. FIG. 3 illustrates the end of the solid wires 18 being received in the apertures 22 in one of the side channels 20 of the frame 12.

As shown in FIG. 1, a standard sieve also includes a handle 24 which is connected to an elongated adjustment bar 26 which extends perpendicularly to the solid metal wires 18 and includes a plurality of longitudinally spaced recesses or apertures for engaging a crank on each wire 18, thereby controlling the angular disposition of the slats 14 and the size of the openings between the banks of slats. By this arrangement, the slats 14 effectively become louvers and can be adjusted, using the handle 24, to any position between fully open and fully closed. The sieve 10 is mechanically supported for reciprocal shifting movement or agitation (i.e., shaking) to cause the grain to separate from the chaff and fall downwardly through the openings 16 between the banks of slats.

Sieves (and chaffers) in combines are subject to wear in the components, especially in the cross wires 18 that support the louvers. The wires 18 wear in the holes 22 in the side channels 20 and dividers 16, and/or the holes 22 in the side channels 20 and dividers 16 wear and become elongated. In order to assemble a sieve 10, the holes 22 need to have enough clearance to slide the wires 18 and side channel members 20 of the frame 12 together. In order to minimize the wear, springs have been used to put pressure on the wires 18 and keep them from moving. However, the springs require that high forces be applied in order to adjust the louvers. Additionally, adding springs to the assembly increases both the overall cost of the assembly as well as increases the labor required to assemble the sieve.

The weight of the sieves is another key consideration. If the wires 18 are made to a larger diameter, then the overall frame 12 will be heavier. Any additional weight is detrimental to the operation of the system. Adding weight to the overall sieve assembly is detrimental for a number of reasons. For example, the additional weight means heavier structures to support them. This leads to requiring a heavier mass (i.e., more power, etc.) to agitate or shake the sieve. Furthermore, combines are already very heavy machines and the industry is always trying ways to make them weigh less. Reducing the overall weight of a combine provides for reduced ground pressure (compacting of the fields and road weight limits). Finally, increasing the weight of a sieve assembly results in it being more difficult to remove/replace the sieve.

Another characteristic of sieves is related to the precision of the louvers. When the louvers are adjusted, the solid wires tend to twist due to reacting forces (i.e., torsion). This causes a variation in the louver positions.

Finally, ideally sieves are made to last 2000 hours or more. However, in many applications, the wires which support the louvers effectively amount to a weak link in the overall system and do not last 2000 hours.

SUMMARY

An object of an embodiment of the present invention is to provide a high strength sieve for use in a combine harvester.

Briefly, an embodiment of the present invention provides a high strength sieve which is lightweight and durable without having to add springs, and without requiring a high level of force to effect adjustment of the louvers.

In a preferred embodiment, the high strength sieve comprises hollow tubes which support the louvers. Providing hollow tubes (i.e., rather than solid wires) allows for larger diameter holes to be used in the frame, i.e., the holes which support the tubes. This provides for an added bearing surface, as well as provides for better tolerance ratio between the diameter of the tubes vs. the diameter of the holes in the frame which support the tubes. This reduces the relative movement of the tubes within the holes.

Preferably, the tubes are mounted in the frame through holes which are extruded. The extruded holes also provide for an increased bearing surface, as well as promote a tighter fit between the tubes and the frame. The fact that the holes are extruded also works to provide a natural lead-in for the insertion of the tubes (i.e., during assembly of the sieve). These overall features provide for reduced wear without having to employ springs and resulting added spring pressure. The use of hollow tubes (vs. the use of solid wires) results in no increase in force needed to adjust the angular position of the louvers. The tubes have improved sectional properties compared to solid wires, thus improving the stiffness of the louvers and reducing the amount of twisting that takes place during operation.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
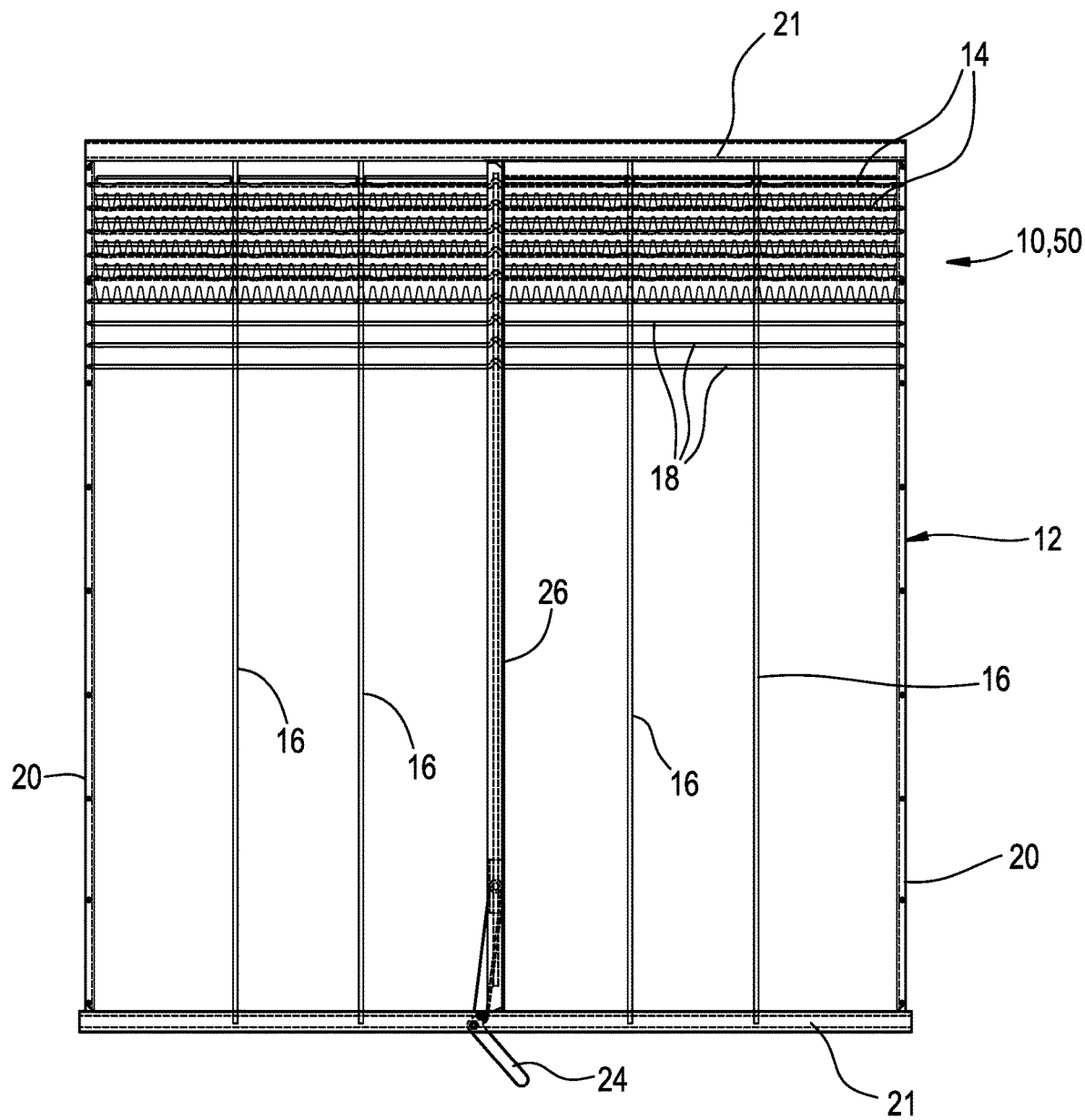
FIG. 1 is a top view of a standard sieve construction.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 4:
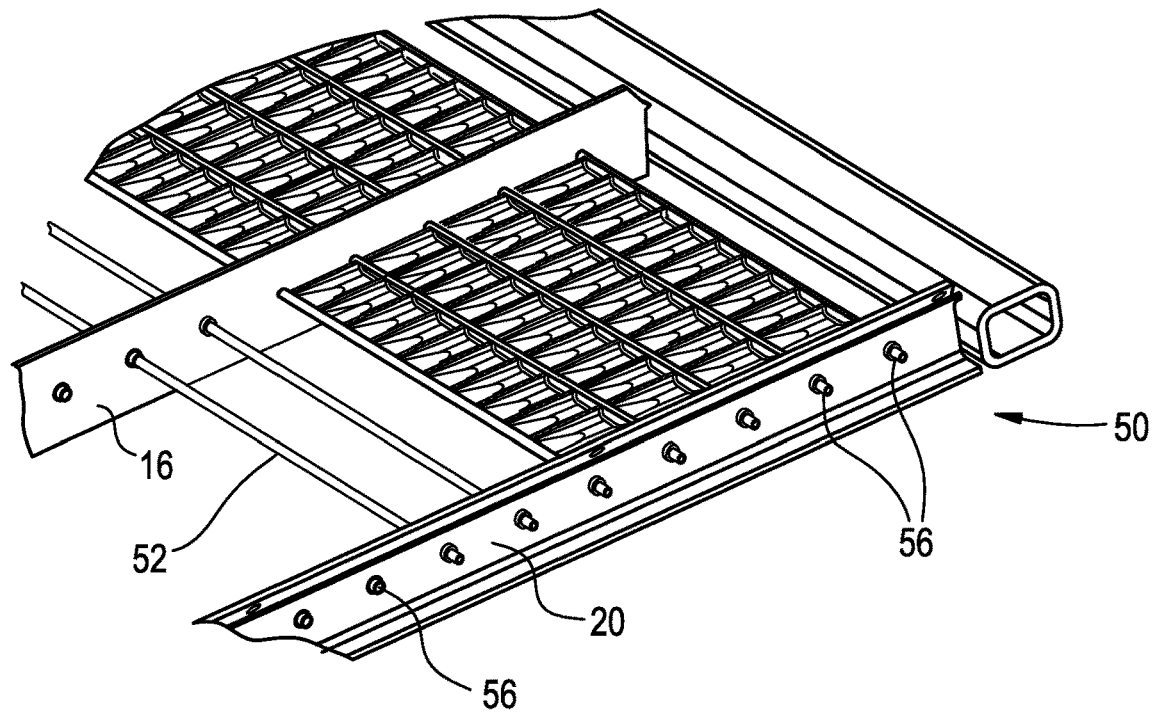
FIGS. 4 and 5 are similar to FIGS. 2 and 3, respectively, but illustrate a construction that is in accordance with an embodiment of the present invention.

An embodiment of the present invention provides a sieve 50 which is as shown in FIG. 1, but instead of utilizing solid wires 18, hollow tubes 52 are used. As shown in FIG. 4, the hollow tubes 52 (much like the solid metal wires 18 of the sieve 10 shown in FIG. 1) support slats or louvers 14, and the hollow tubes 52 extend from one side channel 20 of the frame 12 to another side channel 20, and one or more dividers 16 can be also provided, connected to the ends 21 of the frame 12.

Figure 2:
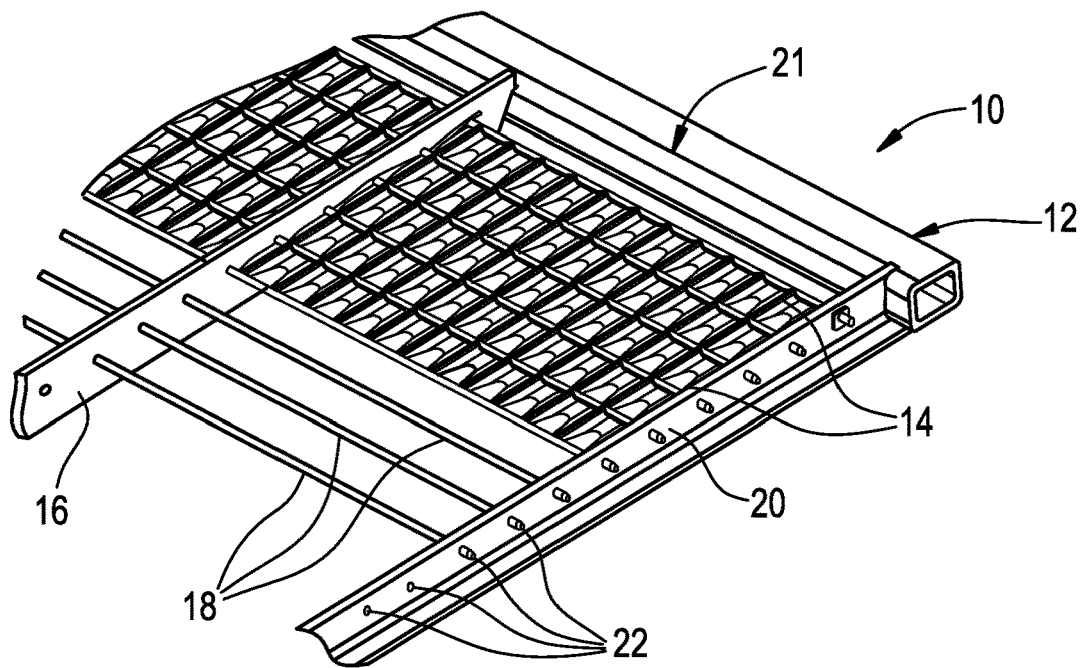
FIG. 2 provides a close up view of one of the corners of the sieve shown in FIG. 1.
Figure 3:
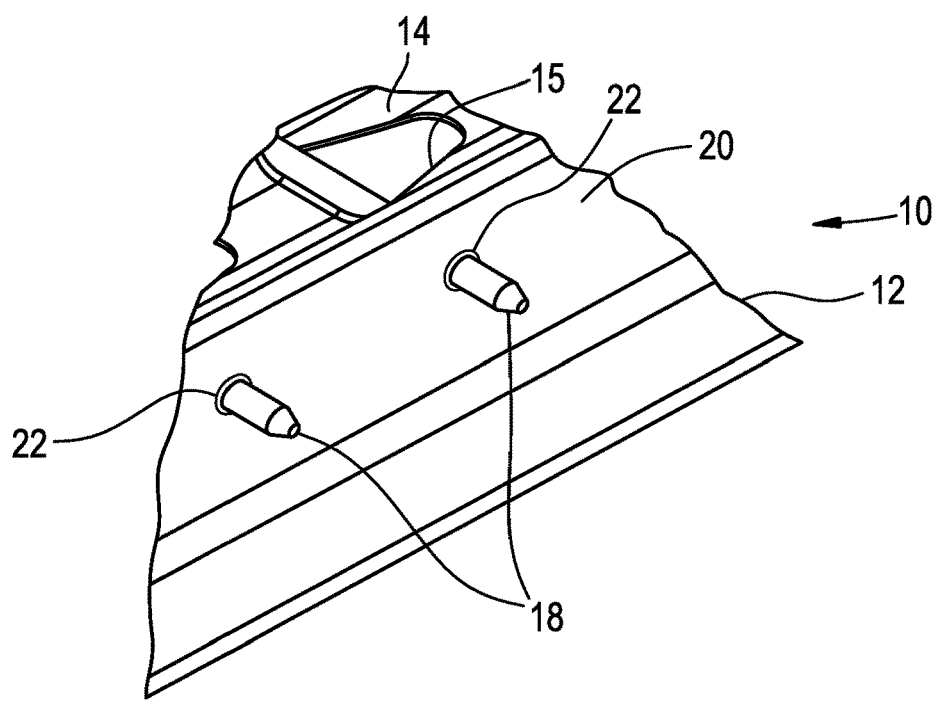
FIG. 3 provides a close up view of a portion of FIG. 2, showing a solid wire extending through a straight cut hole.
Figure 5:
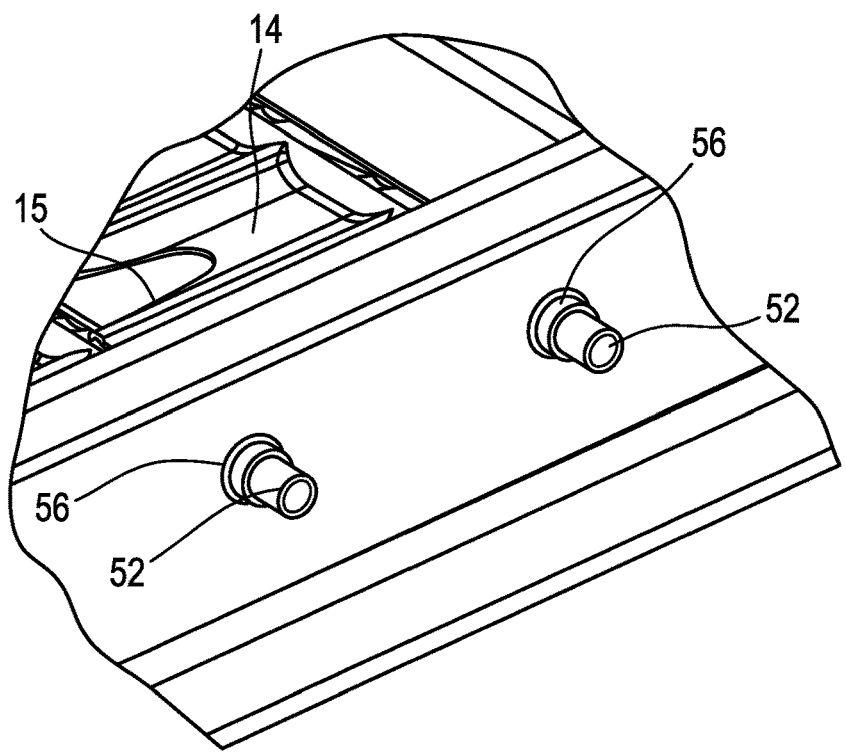

FIG. 4 illustrates, in more detail, the louvers 14 and the hollow tubes 52 which support the louvers 14 and which extend through apertures or holes 56 provided in the side channel members 20 and the dividers 16. By providing hollow tubes 52 as shown in FIGS. 4 and 5 (i.e., rather than solid wires 18 as shown in FIGS. 2 and 3), larger diameter holes 56 can be used in the side channel members 20 and dividers 16. This provides for increased bearing surfaces, as well as provides for tighter tolerances between the diameter of the hollow tubes 52 versus the diameter of the apertures 56 in the side channels members 20 and dividers 16. This results in decreased movement (i.e., during operation) of the hollow tubes 52 within these apertures 56.

Preferably, the apertures 56 in the side channels members 20 and dividers 16 (i.e., through which the hollow tubes 52 extend) are extruded as opposed to being straight cut. The extruded holes 56 also provide for increased bearing surfaces, as well as promote better tolerances between the hollow tubes 52 and the side channel members 20 and dividers 16. The fact that the holes 56 are extruded also functions to make assembly of the sieve easier by providing a natural lead-in for the insertion of the tubes 52.

The construction disclosed herein, i.e., the use of hollow tubes 52 and extruded holes 56 provide for reduced wear without having to employ springs. The fact that the tubes 52 are hollow does not require an increase in force needed to move the handle 24 and adjust the angular position of the louvers 14. Furthermore, the fact that the tubes 52 are hollow improves the stiffness of the louvers 14, as well as reduces the amount of twisting that takes place during operation.

The fact that the tubes 52 which support the louvers 14 are hollow provides for an increased life of the sieve 50 because of reduced wear at the mounting holes 56. Additionally, the tubes 52 provide added stiffness to the louvers 14 due to the increased sectional properties of the hollow tubes 52, as compared to the solid wires 18. This improves the precision of the louvers 14. The fact that the holes 56 through which the hollow tubes 52 extend are extruded provides a larger surface for engagement by the tubes 52. This increases the life of the sieve 50 because of reduced wear at the mounting holes 56.

Figure 6:
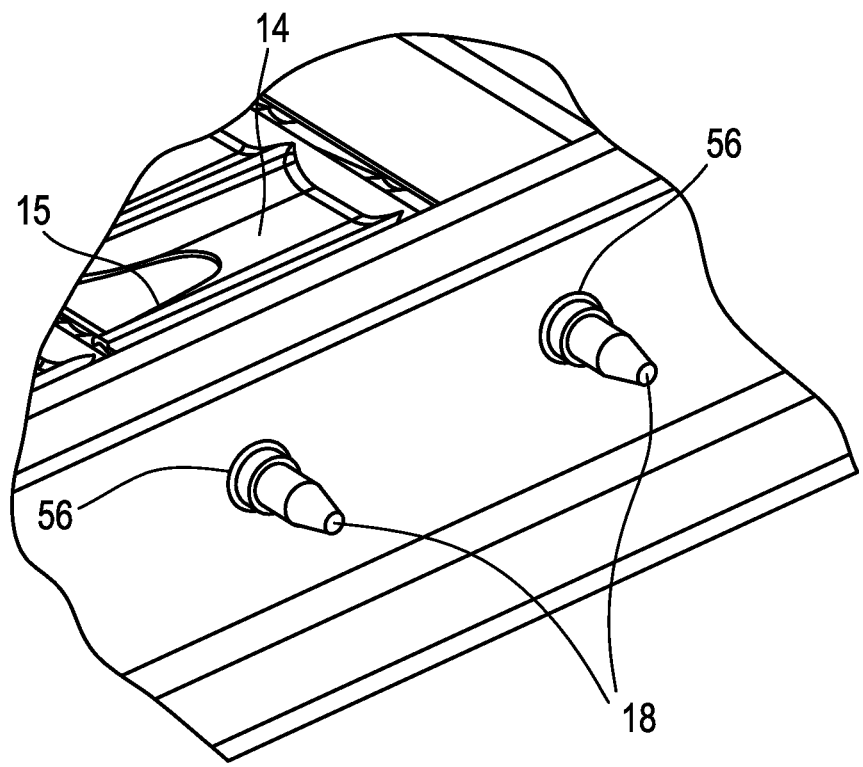
FIG. 6 is similar to FIGS. 3 and 5, but illustrate a construction that is in accordance with yet another embodiment of the present invention.

FIG. 6 is similar to FIGS. 3 and 5, but illustrate a construction that is in accordance with yet another embodiment of the present invention. In the embodiment shown in FIG. 6, a sieve is provided which is very much like those sieves described previously, with the only difference being that extruded holes 56 are provided to support solid wires 18 (i.e., instead of hollow tubes 52). The fact that the holes 56 through which the solid wires 18 extend are extruded, rather than straight cut, provides a larger surface for engagement by the wires 18. This increases the life of the sieve because of reduced wear at the mounting holes 56.

While specific embodiments of the invention have been shown and described, it is envisioned that those skilled in the art may devise various modifications without departing from the spirit and scope of the present invention.

What is claimed is:

1. A sieve for use in a combine harvester, said sieve comprising: a frame; louvers; and uniformly straight, uniformly round hollow tubes which support the louvers, wherein the frame comprises two channels and at least one divider, each of said two channels and at least one divider having round apertures therein, wherein the uniformly straight, uniformly round hollow tubes which support the louvers extend all the way through the round apertures.

2. A sieve as recited in claim 1, further comprising a handle, wherein movement of the handle adjusts an angular position of the louvers.

3. A sieve as recited in claim 1, wherein the round apertures comprise extruded holes as opposed to being straight cut, said extruded holes providing increased bearing surfaces on the frame.

* * * * *